(12) United States Patent
Hong

(10) Patent No.: US 11,212,856 B2
(45) Date of Patent: Dec. 28, 2021

(54) UNMANNED AERIAL VEHICLE ACCESS METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/809,155

(22) Filed: Mar. 4, 2020

(65) Prior Publication Data
US 2020/0205211 A1 Jun. 25, 2020

Related U.S. Application Data

(63) Continuation of application No. PCT/CN2017/100731, filed on Sep. 6, 2017.

(51) Int. Cl.
*H04W 76/00* (2018.01)
*H04W 76/14* (2018.01)
(Continued)

(52) U.S. Cl.
CPC ........... *H04W 76/14* (2018.02); *B64C 39/024* (2013.01); *H04L 61/6054* (2013.01); *H04W 8/04* (2013.01);
(Continued)

(58) Field of Classification Search
CPC ..... H04W 76/14; H04W 76/11; H04W 12/69; H04W 8/04; H04W 8/08; H04W 28/0268;
(Continued)

(56) References Cited

U.S. PATENT DOCUMENTS 9,820,184 B2 11/2017 Griot et al.
2010/0161155 A1 6/2010 Simeray
(Continued)

FOREIGN PATENT DOCUMENTS

CN 101662415 A 3/2010
CN 101730035 A 6/2010
(Continued)

OTHER PUBLICATIONS

International Search Report in the International Application No. PCT/CN2017/100731, dated May 2, 2018.
(Continued)

*Primary Examiner* — Khai M Nguyen
(74) *Attorney, Agent, or Firm* — Finnegan, Henderson, Farabow, Garrett & Dunner, L.L.P.

(57) ABSTRACT

A method for access of an unmanned aerial vehicle (UAV) to a cellular network, includes: receiving an access request sent by the UAV; verifying an identity of a user using the UAV and a device identity of the UAV according to the attach request to obtain a verification result; if the verification result indicates that a verification succeeds, allow the access of the UAV and send a first attach response for indicating that access is allowed to the UAV; and if the verification result indicates that the verification fails, reject the access of the UAV and send a second attach response for indicating that access is rejected to the UAV.

16 Claims, 14 Drawing Sheets

(51) Int. Cl.
  *H04W 76/11* (2018.01)
  *B64C 39/02* (2006.01)
  *H04L 29/12* (2006.01)
  *H04W 8/04* (2009.01)
  *H04W 8/08* (2009.01)
  *H04W 28/02* (2009.01)
  *H04W 48/02* (2009.01)
  *H04W 12/69* (2021.01)

(52) U.S. Cl.
  CPC ............ *H04W 8/08* (2013.01); *H04W 12/69* (2021.01); *H04W 28/0268* (2013.01); *H04W 48/02* (2013.01); *H04W 76/11* (2018.02)

(58) Field of Classification Search
  CPC ... H04W 48/02; B64C 39/024; H04L 61/6054
  See application file for complete search history.

(56) References Cited

U.S. PATENT DOCUMENTS

| | | | |
|---|---|---|---|
| 2016/0088515 A1 | 3/2016 | Griot et al. | |
| 2018/0192267 A1* | 7/2018 | Zavesky | H04M 1/72409 |
| 2018/0218619 A1* | 8/2018 | Brown | G08G 5/0034 |
| 2018/0253092 A1* | 9/2018 | Trapero Esteban | H04W 12/06 |

FOREIGN PATENT DOCUMENTS

| | | | |
|---|---|---|---|
| CN | 102026303 A | 4/2011 |
| CN | 102905266 A | 1/2013 |
| CN | 104754542 A | 7/2015 |
| CN | 105225540 A | 1/2016 |
| CN | 106507276 A | 3/2017 |
| CN | 106658478 A | 5/2017 |
| CN | 106716961 A | 5/2017 |
| JP | 2008105591 A | 5/2008 |
| WO | WO 2017/013417 A1 | 1/2017 |

OTHER PUBLICATIONS

English translation of the Written Opinion of the International Search Authority in the International Application No. PCT/CN2017/100731, dated May 2, 2018.

Supplementary European Search Report in the European application No. 17924007.2, dated Aug. 7, 2020.

Office Action dated Jun. 24, 2021, from Intellectual Property India Patent Office in counterpart Indian Application No. 202047014191.

First Office Action dated Apr. 30, 2021, from The State Intellectual Property Office of People's Republic of China in counterpart Chinese Application No. 201780001551.1.

* cited by examiner

US 11,212,856 B2

UNMANNED AERIAL VEHICLE ACCESS METHOD AND DEVICE

CROSS-REFERENCE TO RELATED APPLICATION

This application is a continuation of International Patent Application No. PCT/CN2017/100731 filed on Sep. 6, 2017, the content of which is incorporated by reference in its entirety.

TECHNICAL FIELD

The present disclosure generally relates to the technical field of communication, and more particularly, to an unmanned aerial vehicle (UAV) access method and device.

BACKGROUND

An unmanned aerial vehicle (UAV) is generally operated by a radio remote control device and the UAV's own program control device.

With the continuous development of the UAV technology, UAVs have been widely used. In related art, in order to further expand an application range of a UAV, a cellular network needs to provide a service for the UAV to satisfy demand. However, it may be difficult to use an existing cellular network to control the UAV, and if a UAV of any user is allowed to access the cellular network, strong interference may be brought to the cellular network.

SUMMARY

According to a first aspect of the embodiments of the present disclosure, a method for access of an unmanned aerial vehicle (UAV) to a cellular network is provided. The method includes: receiving an attach request sent by the UAV; verifying an identity of a user using the UAV and a device identity of the UAV according to the attach request to obtain a verification result; if the verification result indicates that a verification succeeds, allowing the access of the UAV and sending a first attach response for indicating that access is allowed to the UAV; and if the verification result indicates that the verification fails, rejecting the access of the UAV and sending a second attach response for indicating that access is rejected to the UAV.

According to a second aspect of the embodiments of the present disclosure, a method for an unmanned aerial vehicle (UAV) to access a cellular network is provided, the UAV having an International Mobile Subscriber Identification Number (IMSI) and an International Mobile Equipment Identity (IMEI). The method includes: sending an attach request to a Mobility Management Entity (MME); when a first attach response for indicating that access is allowed is received from the MME, determining that the MME allows access of the UAV; and when a second attach response for indicating that access is rejected is received from the MME, determining that the MME rejects the access of the UAV.

According to a third aspect of the embodiments of the present disclosure, a device for access of an unmanned aerial vehicle (UAV) to a cellular network is provided. The device includes: a processor; and a memory storing instructions executable by the processor, wherein the processor is configured to: receive an attach request sent by the UAV; verify an identity of a user using the UAV and a device identity of the UAV according to the attach request to obtain a verification result; if the verification result indicates that a verification succeeds, allow the access of the UAV and send a first attach response for indicating that access is allowed to the UAV; and if the verification result indicates that the verification fails, reject the access of the UAV and send a second attach response for indicating that access is rejected to the UAV.

According to a fourth aspect of the embodiments of the present disclosure, a device for access of an unmanned aerial vehicle (UAV) to a cellular network is provided, the UAV having an International Mobile Subscriber Identification Number (IMSI) and an International Mobile Equipment Identity (IMEI). The device includes: a processor; and a memory storing instructions executable by the processor, wherein the processor is configured to: send an attach request to a Mobility Management Entity (MME); when a first attach response for indicating that access is allowed is received from the MME, determine that the MME allows the access of the UAV; and when a second attach response for indicating that access is rejected is received from the MME, determining that the MME rejects the access of the UAV.

The technical solutions provided in the embodiments of the present disclosure may have the following beneficial effects.

In the embodiments of the present disclosure, the MME may receive the attach request sent by the UAV, verify the identity of the user using the UAV and the device identity of the UAV according to the attach request to obtain the verification result, if the verification result indicates that verification succeeds, allow access of the UAV and send the first attach response for indicating that access is allowed to the UAV, and if the verification result indicates that verification fails, reject access of the UAV and send the second attach response for indicating that access is rejected to the UAV, so that access of a UAV that fails to be verified to a cellular network may be prevented to reduce interference to the cellular network, access reliability of the UAV is improved, dedicated service may be conveniently provided for a UAV that is successfully verified, and working efficiency of the UAV is improved.

In the embodiments of the present disclosure, the UAV may send the attach request to the MME, it is determined that the MME allows access of the UAV when the first attach response for indicating that access is allowed is received from the MME, and it is determined that the MME rejects access of the UAV when the second attach response for indicating that access is rejected is received from the MME, so that the MME may control access of the UAV, and access security of the UAV is improved.

In the embodiments of the present disclosure, the HSS may receive the update location request sent by the MME, the update location request containing the IMSI of the UAV that requests for access, send the first update location reply configured to indicate that the QoS configuration information of the UAV is obtained by query to the MME if the QoS configuration information of the UAV is obtained by query, the first update location reply containing the QoS configuration information of the UAV, and send the second update location reply configured to indicate that the QoS configuration information of the UAV is not obtained by query to the MME if the QoS configuration information of the UAV is not obtained by query, so that the HSS may assist the MME in completing verification over the identity of the user using the UAV, and the access reliability of the UAV is improved.

In the embodiments of the present disclosure, the EIR may receive the ME device identity check request sent by the MME, the ME device identity check request containing the IMEI of the UAV that requests for access, query the corresponding registration record according to the IMEI of the UAV to obtain the query result and send the ME device identity check ACK containing the query result to the MME, so that the EIR may assist the MME in completing verification over the device identity of the UAV, and the access reliability of the UAV is improved.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
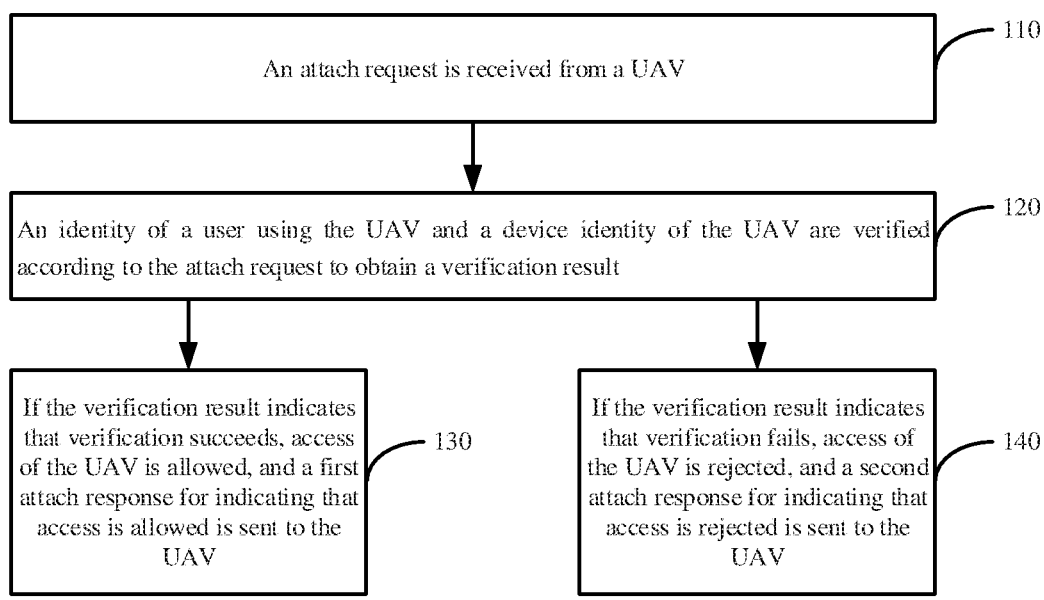
FIG. 1 is a flow chart illustrating a UAV access method, according to an exemplary embodiment.

FIG. 1 is a flow chart illustrating an unmanned aerial vehicle (UAV) access method, according to an exemplary embodiment. The UAV access method may be applied to a Mobility Management Entity (MME). As illustrated in FIG. 1, the UAV access method may include the following steps.

In step 110, an attach request sent by a UAV is received.

In the embodiment, the UAV is a cellular-network-based UAV, namely the UAV may accept service provided by a cellular network. When the UAV needs to access the cellular network, it may send the attach request to the MME to enable the MME to verify an identity of a user using the UAV and a device identity of the UAV. The UAV, when sending the attach request to the MME, may transmit the attach request to the MME transparently through a base station.

In step 120, an identity of a user using the UAV and a device identity of the UAV are verified according to the attach request to obtain a verification result.

In the embodiment, the MME may verify the identity of the user using the UAV. For example, verification is performed according to an international Mobile Subscriber Identification Number (IMSI) of the UAV. The IMSI is a label distinguishing the user of the UAV, is stored in a Subscriber Identity Module (SIM) card and is valid information configured to distinguish the user of the UAV.

The MME may also verify the device identity of the UAV. For example, verification is performed according to an International Mobile Equipment Identity (IMEI) of the UAV. In the Global System for Mobile Communications Alliance (GSMA), a new device type of a UAV is defined, a corresponding Type Allocation Code (TAC) is allocated for the device type of the UAV, and an IMEI is formed. An aforementioned IMEI is required to be allocated to each cellular-network-based UAV.

In step 130, if the verification result indicates that verification succeeds, access of the UAV is allowed, and a first attach response for indicating that access is allowed is sent to the UAV.

In the embodiment, if the MME allows access of the UAV, it is indicated that the UAV may access the cellular network. Moreover, the MME, when sending the first attach response for indicating that access is allowed to the UAV, may further transmit the first attach response to the UAV transparently through the base station.

In step 140, if the verification result indicates that verification fails, access of the UAV is rejected, and a second attach response for indicating that access is rejected is sent to the UAV.

In the embodiment, if the MME rejects access of the UAV, it is indicated that the UAV is not allowed to access the cellular network. Moreover, the MME, when sending the second attach response for indicating that access is rejected to the UAV may further transmit the second attach response to the UAV transparently through the base station.

In the embodiment, the attach request sent by the UAV is received, the identity of the user using the UAV and the device identity of the UAV are verified according to the attach request to obtain the verification result, if the verification result indicates that verification succeeds, access of the UAV is allowed and the first attach response for indicating that access is allowed is sent to the UAV, and if the verification result indicates that verification fails, access of the UAV is rejected and the second attach response for indicating that access is rejected is sent to the UAV, so that access of a UAV that fails to be verified to the cellular network may be prevented to reduce interference to the cellular network, access reliability of the UAV is improved, dedicated service may be conveniently provided for a UAV that is successfully verified, and working efficiency of the UAV is improved.

Figure 2:
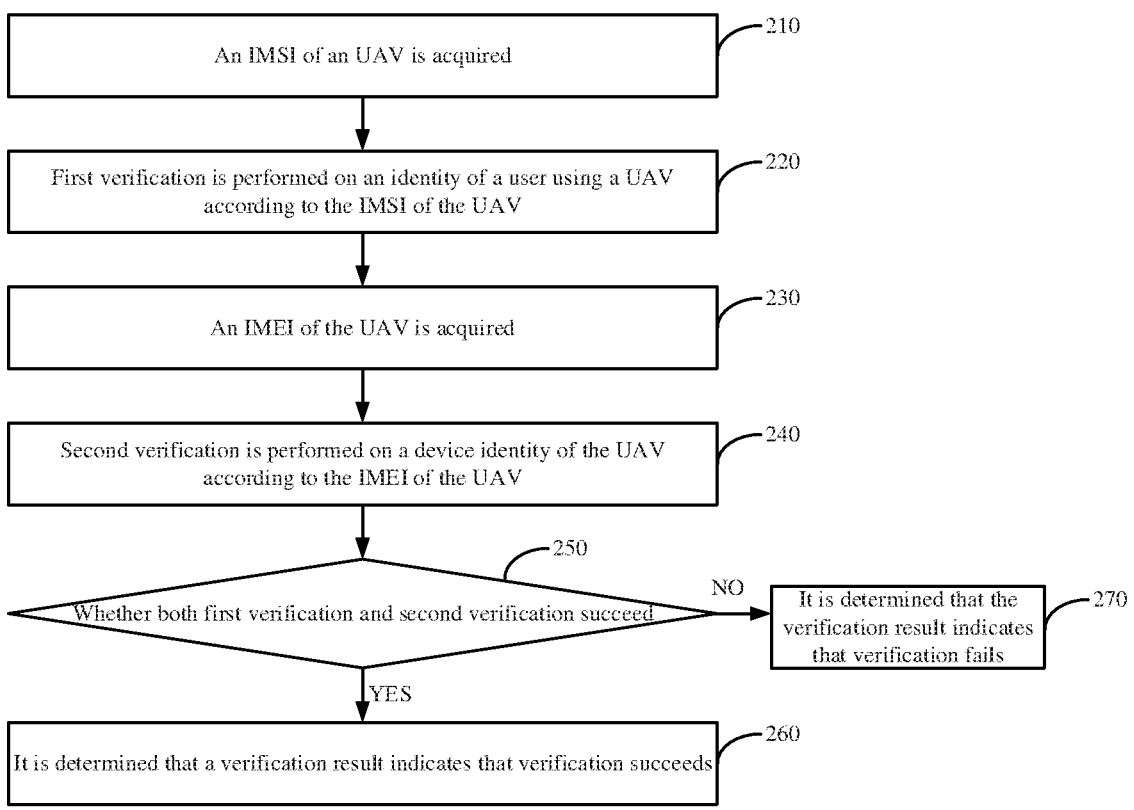
FIG. 2 is a flow chart illustrating a UAV access method, according to an exemplary embodiment.

FIG. 2 is a flow chart illustrating a UAV access method, according to an exemplary embodiment. The UAV access method may be applied to the MME, and is based on the method illustrated in FIG. 1. As illustrated in FIG. 2, when the MME verifies the identity of the user using the UAV and the device identity of the UAV according to the attach request to obtain the verification result, the following steps may be included.

In step 210, an IMSI of the UAV is acquired.

In step 220, a first verification is performed on the identity of the user using the UAV according to the IMSI of the UAV.

In step 230, an IMEI of the UAV is acquired.

In step 240, a second verification is performed on the device identity of the UAV according to the IMEI of the UAV.

In the embodiment, there is no requirement on a sequence for execution of step 210 and step 230, and step 210 may be executed before step 230 is executed, or step 230 may be executed before step 210 is executed, or step 210 and step 230 may be executed at the same time.

In step 250, whether the first verification and the second verification succeed is determined. If both the first verification and the second verification succeed, step 260 is executed, and if at least one of the first verification and the second verification does not succeed, step 270 is executed.

In step 260, it is determined that the verification result indicates that verification succeeds, and the flow is ended.

In step 270, it is determined that the verification result indicates that verification fails, and the flow is ended.

In the embodiment, the IMSI of the UAV is acquired, the first verification is performed on the identity of the user using the UAV according to the IMSI of the UAV, the IMEI of the UAV is acquired, the second verification is performed on the device identity of the UAV according to the IMEI of the UAV, it is determined that the final verification result indicates that verification succeeds only when the first verification and the second verification succeed, otherwise verification fails, so that it is ensured that access of the UAV is allowed only when both the identity of the user using the UAV and the device identity of the UAV are legal to reduce interference of an illegal UAV to the cellular network, and a verification standard for access of the UAV may be improved to provide network service for the UAV.

In an embodiment, the UAV, when sending the attach request to the MME, may or may not add the IMSI of the UAV into the attach request. Therefore, when the IMSI of the UAV is acquired in step 210, the following acquisition manner may be used: whether the attach request contains the IMSI of the UAV is determined; if the attach request contains the IMSI of the UAV, the IMSI of the UAV is read from the attach request; and if the attach request does not contain the IMSI of the UAV, a user identity request is sent to the UAV, the user identity request being configured to instruct the UAV to provide the UAV's IMSI, and a user identity response sent by the UAV is received, the user identity response containing the IMSI of the UAV.

In the embodiment, the IMSI of the UAV may be directly read from the attach request and the UAV may also be actively required to provide its own IMSI. In such a manner, the MME may conveniently verify the identity of the user through the IMSI provided by the UAV, so that user identity verification efficiency is improved.

In an embodiment, when the first verification is performed on the identity of the user using the UAV according to the IMSI of the UAV in step 220, verification may be performed through a Home Subscriber Server (HSS). An exemplary verification process includes the following operations.

In a first operation, an update location request is sent to the HSS, the update location request containing the IMSI of the UAV.

In the embodiment, the HSS, after receiving the update location request, may query dedicated Quality of Service (QoS) configuration information of the UAV according to the IMSI of the UAV, and may send a first update location reply for indicating that the QoS configuration information of the UAV is obtained by query to the MME if the QoS configuration information of the UAV is obtained by query, the first update location reply containing the QoS configuration information of the UAV, and send a second update location reply for indicating that the QoS configuration information of the UAV is not obtained by query to the MME if the QoS configuration information of the UAV is not obtained by query.

The update location reply contains the QoS configuration information of the UAV, and the second update location reply does not contain the QoS configuration information of the UAV.

In a second operation, if a first update location reply for indicating that QoS configuration information of the UAV is obtained by query is received from the HSS and the first update location reply contains the QoS configuration information of the UAV, it is determined that first verification succeeds.

In a third operation, if a second update location reply for indicating that the QoS configuration information of the UAV is not obtained by query is received from the HSS, it is determined that first verification fails.

In the embodiment, the update location request is sent to the HSS, the update location request containing the IMSI of the UAV, it is determined that first verification succeeds if the first update location reply configured to indicate that the QoS configuration information of the UAV is obtained by query is received from the HSS and the first update location reply contains the QoS configuration information of the UAV, and it is determined that first verification fails if the second update location reply configured to indicate that the QoS configuration information of the UAV is not obtained by query is received from the HSS, so that verification over the identity of the user using the UAV is implemented through the MME, and the user identity verification efficiency is further improved.

In an embodiment, the UAV, when sending the attach request to the MME, may or may not add the IMEI of the UAV into the attach request. Therefore, when the IMEI of the UAV is acquired in step 210, the following acquisition manner may be used: whether the attach request contains the IMEI of the UAV is determined; if the attach request contains the IMEI of the UAV, the IMEI of the UAV is read from the attach request; and if the attach request does not contain the IMEI of the UAV, a device identity request is sent to the UAV, the device identity request being configured to instruct the UAV to provide the UAV's own IMEI, and a device identity response sent by the UAV is received, the device identity response containing the IMEI of the UAV.

In the embodiment, the IMEI of the UAV may be directly read from the attach request and the UAV may also be actively required to provide its own IMEI. In such a manner, the MME may conveniently verify the device identity through the IMEI provided by the UAV, so that device identity verification efficiency is improved.

In an embodiment, when the second verification is performed on the device identity of the UAV according to the IMEI of the UAV in step 220, verification may be performed through an Equipment Identity Register (EIR). An exemplary verification process includes the following operations.

In a first operation, a device identity check request is sent to the EIR, the device identity check request containing the IMEI of the UAV.

In a second operation, a device identity check acknowledgement (ACK) sent by the EIR is received, the device identity check ACK containing a query result obtained by the MME querying a corresponding registration record according to the IMEI of the UAV.

In a third operation, if the query result indicates that the registration record of the UAV is obtained by query, it is determined that second verification succeeds.

In a fourth operation, if the query result indicates that the registration record of the UAV is not obtained by query, it is determined that second verification fails.

In the embodiment, the device identity check request is sent to the EIR, the device identity check request containing the IMEI of the UAV, the device identity check ACK sent by the EIR is received, the device identity check ACK containing the query result obtained after the MME queries the corresponding registration record according to the IMEI of the UAV, it is determined that second verification succeeds if the query result indicates that the registration record of the UAV is obtained by query, and it is determined that second verification fails if the query result indicates that the registration record of the UAV is not obtained by query, so that verification over the device identity of the UAV is implemented through the EIR, and the device identity verification efficiency is further improved.

Figure 3:
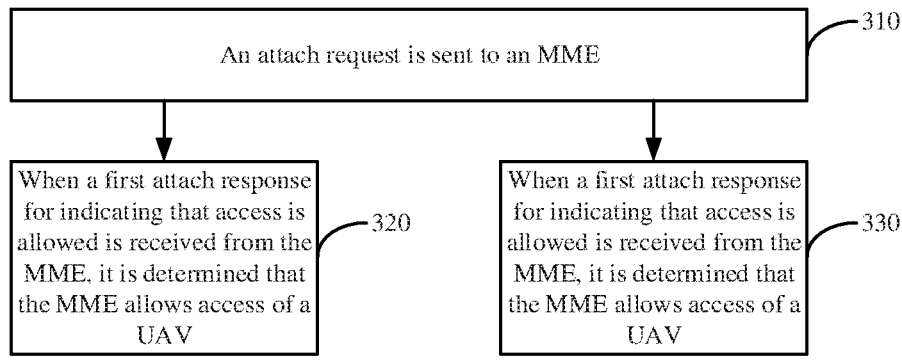
FIG. 3 is a flow chart illustrating a UAV access method, according to an exemplary embodiment.

FIG. 3 is a flow chart illustrating a UAV access method, according to an exemplary embodiment. The UAV access method may be applied to a UAV, the UAV having an IMSI and an IMEI. As illustrated in FIG. 3, the UAV access method may include the following steps.

In step 310, an attach request is sent to an MME.

In step 320, when a first attach response for indicating that access is allowed is received from the MME, it is determined that the MME allows access of the UAV.

In step 330, when a second attach response for indicating that access is rejected is received from the MME, it is determined that the MME rejects access of the UAV.

In the embodiment, the attach request is sent to the MME, it is determined that the MME allows access of the UAV when the first attach response for indicating that access is allowed is received from the MME, and it is determined that the MME rejects access of the UAV when the second attach response for indicating that access is rejected is received from the MME, so that the MME may control access of the UAV, and access security of the UAV is improved.

In an embodiment, based on the method illustrated in FIG. 3, the UAV access method may further include the following operations.

In a first operation, a user identity request sent by the MME is received, the user identity request being configured to instruct the UAV to provide the UAV's own IMSI.

In a second operation, a user identity response is sent to the MME, the user identity response containing the IMSI of the UAV.

In the embodiment, the user identity request sent by the MME is received, the user identity request being configured to instruct the UAV to provide the UAV's own IMSI, and the user identity response is sent to the MME, the user identity response containing the IMSI of the UAV. In such a manner, the MME may conveniently perform user identity verification by use of the IMSI provided by the UAV, so that user identity verification efficiency of the UAV is improved.

In an embodiment, based on the method illustrated in FIG. 3, the UAV access method may further include the following operations.

In a first operation, a device identity request sent by the MME is received, the device identity request being configured to instruct the UAV to provide the UAV's own IMEI.

In a second operation, a device identity response is sent to the MME, the device identity response containing the IMEI of the UAV.

In the embodiment, the device identity request sent by the MME is received, the device identity request being configured to instruct the UAV to provide the UAV's own IMEI, and the device identity response is sent to the MME, the device identity response containing the IMEI of the UAV. In such a manner, the MME may conveniently perform device identity verification by use of the IMEI provided by the UAV, so that device identity verification efficiency of the UAV is improved.

In an embodiment, based on the method illustrated in FIG. 3, the attach request sent by the UAV contains at least one of the IMSI of the UAV or the IMEI of the UAV.

In the embodiment, the attach request contains at least one of the IMSI of the UAV or the IMEI of the UAV, so that the MME may directly read the IMSI and/or IMEI for legality verification of the UAV from the attach request conveniently, and access efficiency of the UAV is further improved.

Figure 4:
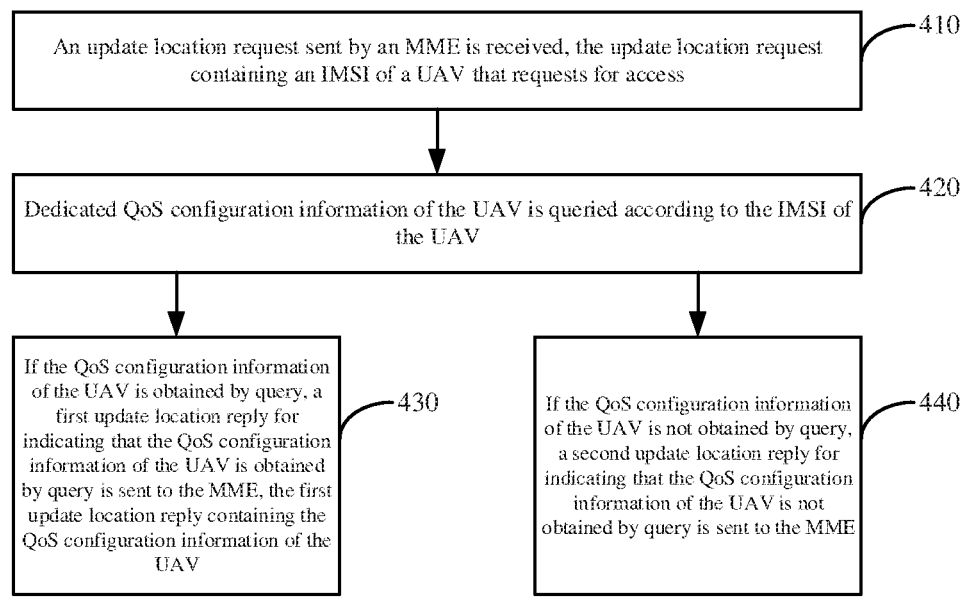
FIG. 4 is a flow chart illustrating a UAV access method, according to an exemplary embodiment.

FIG. 4 is a flow chart illustrating a UAV access method, according to an exemplary embodiment. The UAV access method may be applied to an HSS, the HSS being configured to assist an MME in performing verification on an identity of a user using a UAV. As illustrated in FIG. 4, the UAV access method includes the following steps.

In step 410, an update location request sent by the MME is received, the update location request containing an IMSI of the UAV that requests for access.

In step 420, dedicated QoS configuration information of the UAV is queried according to the IMSI of the UAV.

In step 430, if the QoS configuration information of the UAV is obtained by query, a first update location reply for indicating that the QoS configuration information of the UAV is obtained by query is sent to the MME, the first update location reply containing the QoS configuration information of the UAV.

In step 440, if the QoS configuration information of the UAV is not obtained by query, a second update location reply for indicating that the QoS configuration information of the UAV is not obtained by query is sent to the MME.

In the embodiment, the update location request sent by the MME is received, the update location request containing the IMSI of the UAV that requests for access, the first update location reply configured to indicate that the QoS configuration information of the UAV is obtained by query is sent to the MME if the QoS configuration information of the UAV is obtained by query, the first update location reply containing the QoS configuration information of the UAV, and the second update location reply configured to indicate that the QoS configuration information of the UAV is not obtained by query is sent to the MME if the QoS configuration information of the UAV is not obtained by query, so that the HSS may assist the MME in completing verification over the identity of the user using the UAV, and access reliability of the UAV is improved.

Figure 5:
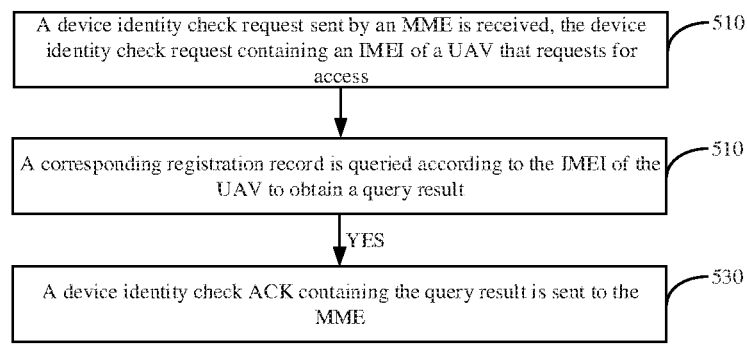
FIG. 5 is a flow chart illustrating a UAV access method, according to an exemplary embodiment.

FIG. 5 is a flow chart illustrating a UAV access method, according to an exemplary embodiment. The UAV access method may be applied to an EIR, the EIR being configured to assist an MME in performing verification on a device identity of a UAV. As illustrated in FIG. 5, the UAV access method includes the following steps.

In step 510, a device identity check request sent by the MME is received, the device identity check request containing an IMEI of the UAV that requests for access.

In step 520, a corresponding registration record is queried according to the IMEI of the UAV to obtain a query result. The query result may include that the registration record of the UAV is obtained by query or that the registration record of the UAV is not obtained by query.

In step 530, a device identity check ACK containing the query result is sent to the MME.

In the embodiment, the device identity check request sent by the MME is received, the device identity check request containing the IMEI of the UAV that requests for access, the corresponding registration record is queried according to the IMEI of the UAV to obtain the query result, and the device identity check ACK containing the query result is sent to the MME, so that the EIR may assist the MME in completing verification over the device identity of the UAV, and access reliability of the UAV is improved.

Figure 6:
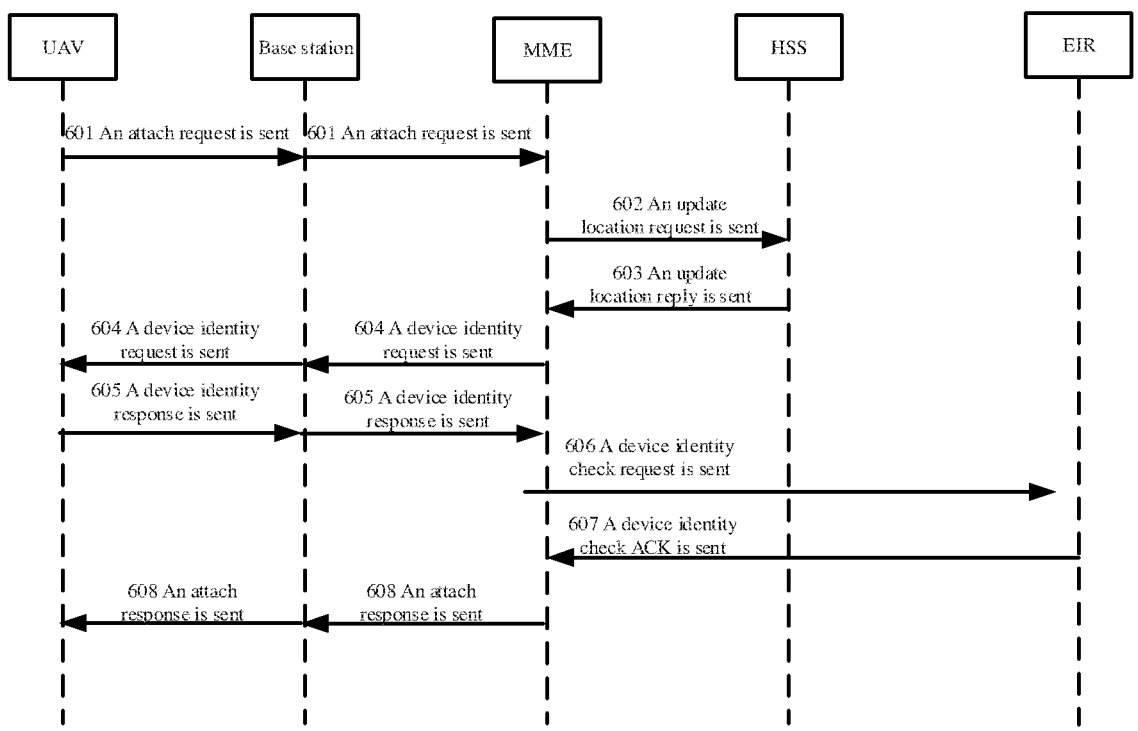
FIG. 6 is an information interaction diagram of a UAV access method, according to an exemplary embodiment.

FIG. 6 is an information interaction diagram of a UAV access method, according to an exemplary embodiment. As illustrated in FIG. 6, the information interaction diagram includes a UAV, a base station, an MME, an HSS and an EIR.

In 601, the UAV sends an attach request to the base station, and the base station transparently transmits the attach request to the MME, the attach request containing an IMSI of the UAV.

In 602, the MME sends an update location request to the HSS, the update location request containing the IMSI of the UAV.

In 603, the HSS sends an update location reply to the MME. The update location reply may be a first update location reply for indicating that QoS configuration information of the UAV is obtained by query, the first update location reply containing the QoS configuration information of the UAV, and may also be a second update location reply for indicating that the QoS configuration information of the UAV is not obtained by query.

In 604, the MME sends a device identity request to the base station, and the base station transparently transmits the device identity request to the UAV, the device identity request being configured to instruct the UAV to provide the UAV's own IMEI.

In 605, the UAV sends a device identity response to the base station, and the base station transparently transmits the device identity response to the MME, the device identity response containing the IMEI of the UAV.

In 606, the MME sends a device identity check request to the EIR, the device identity check request containing the IMEI of the UAV.

In 607, the EIR sends a device identity check ACK to the MME. The device identity check ACK may be a first device identity check ACK configured to indicate that the IMEI of the UAV has been registered, and may also be a second device identity check ACK configured to indicate that the IMEI of the UAV has yet not been registered.

In 608, the MME sends an attach response to the base station, and the base station transparently transmits the attach response to the UAV. The attach response may be a first attach response for indicating that access is allowed, and may also be a second attach response for indicating that access is rejected.

Corresponding to the UAV access method embodiments, the present disclosure also provides UAV access device embodiments.

Figure 7:
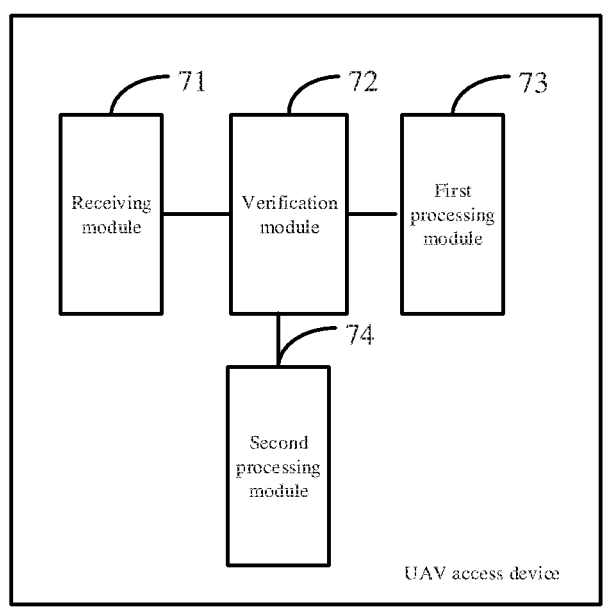
FIG. 7 is a block diagram of a UAV access device, according to an exemplary embodiment.

FIG. 7 is a block diagram of a UAV access device, according to an exemplary embodiment. The UAV access device may be applied to an MME, and is configured to execute the UAV access method illustrated in FIG. 1. As illustrated in FIG. 7, the UAV access device may include a receiving module 71, a verification module 72, a first processing module 73 and a second processing module 74.

The receiving module 71 is configured to receive an attach request sent by a UAV.

The verification module 72 is configured to verify an identity of a user using the UAV and a device identity of the UAV according to the attach request to obtain a verification result.

The first processing module 73 is configured to, if the verification result indicates that verification succeeds, allow access of the UAV and send a first attach response for indicating that access is allowed to the UAV.

The second processing module 74 is configured to, if the verification result indicates that verification fails, reject access of the UAV and send a second attach response for indicating that access is rejected to the UAV.

In the embodiment, the attach request sent by the UAV is received, the identity of the user using the UAV and the device identity of the UAV are verified according to the attach request to obtain the verification result, if the verification result indicates that verification succeeds, access of the UAV is allowed and the first attach response for indicating that access is allowed is sent to the UAV, and if the verification result indicates that verification fails, access of the UAV is rejected and the second attach response for indicating that access is rejected is sent to the UAV, so that access of a UAV that fails to be verified to the cellular network may be prevented to reduce interference to the cellular network, access reliability of the UAV is improved, dedicated service may be conveniently provided for a UAV that is successfully verified, and working efficiency of the UAV is improved.

Figure 8:
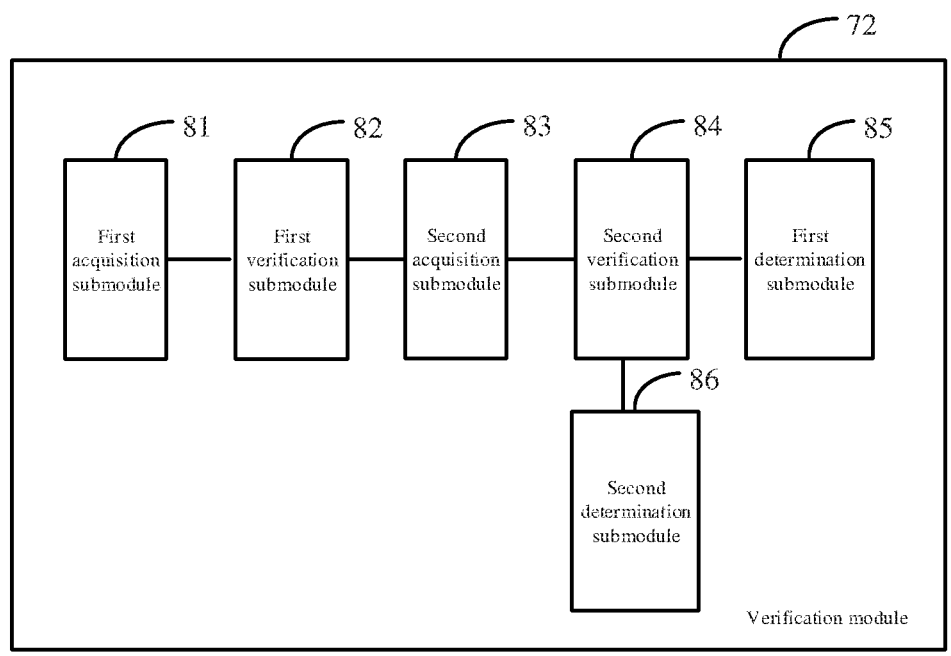
FIG. 8 is a block diagram of a UAV access device, according to an exemplary embodiment.

FIG. 8 is a block diagram of a UAV access device, according to an exemplary embodiment. The UAV access device may be applied to the MME, and is based on the device illustrated in FIG. 7. As illustrated in FIG. 8, the verification module 72 may include a first acquisition submodule 81, a first verification submodule 82, a second acquisition submodule 83, a second verification submodule 84, a first determination submodule 85, and a second determination submodule 86.

The first acquisition submodule 81 is configured to acquire an IMSI of the UAV.

The first verification submodule 82 is configured to perform first verification on the identity of the user using the UAV according to the IMSI of the UAV.

The second acquisition submodule 83 is configured to acquire an IMEI of UAV.

The second verification submodule 84 is configured to perform second verification on the device identity of the UAV according to the IMEI of the UAV.

The first determination submodule 85 is configured to, if both first verification and second verification succeed, determine that the verification result indicates that verification succeeds.

The second determination submodule 86 is configured to, if at least one of first verification and second verification fails, determine that the verification result indicates that verification fails.

In the embodiment, the IMSI of the UAV is acquired, first verification is performed on the identity of the user using the UAV according to the IMSI of the UAV, the IMEI of the UAV is acquired, second verification is performed on the device identity of the UAV according to the IMEI of the UAV, it is determined that the final verification result indicates that verification succeeds only when both first verification and second verification succeed, otherwise verification fails, so that it is ensured that access of the UAV is allowed only when both the identity of the user using the UAV and the device identity of the UAV are legal to reduce interference of an illegal UAV to the cellular network, and a verification standard for access of the UAV may be improved to provide network service for the UAV better.

Figure 9:
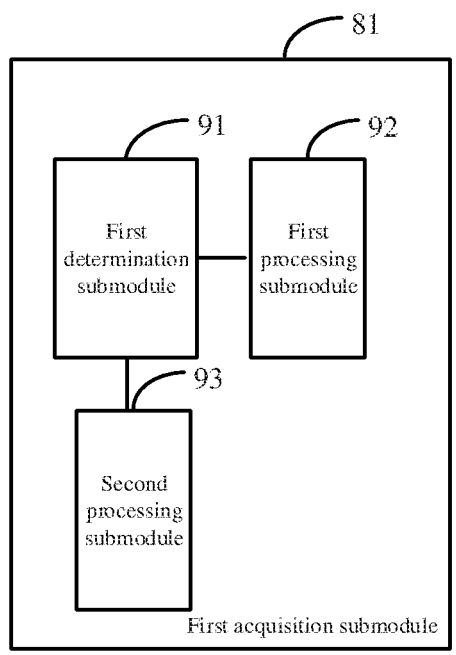
FIG. 9 is a block diagram of a UAV access device, according to an exemplary embodiment.

FIG. 9 is a block diagram of a UAV access device, according to an exemplary embodiment. The UAV access device may be applied to the MME, and is based on the device illustrated in FIG. 8. As illustrated in FIG. 9, the first acquisition submodule 81 may include a first determination submodule 91, a first processing submodule 92 and a second processing submodule 93.

The first determination submodule 91 is configured to determine whether the attach request contains the IMSI of the UAV.

The first processing submodule 92 is configured to, if a determination result of the first determination submodule 91 is that the attach request contains the IMSI of the UAV, read the IMSI of the UAV from the attach request.

The second processing submodule 93 is configured to, if the determination result of the first determination submodule 91 is that the attach request does not contain the IMSI of the UAV, send a user identity request to the UAV, the user identity request being configured to instruct the UAV to provide the UAV's own IMSI, and receive a user identity response sent by the UAV, the user identity response containing the IMSI of the UAV.

In the embodiment, the IMSI of the UAV may be directly read from the attach request and the UAV may also be actively required to provide its own IMSI. In such a manner, the MME may conveniently verify the identity of the user through the IMSI provided by the UAV, so that user identity verification efficiency is improved.

Figure 10:
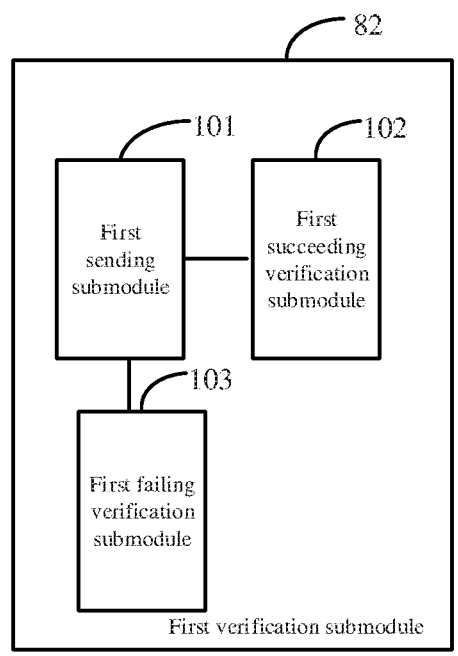
FIG. 10 is a block diagram of a UAV access device, according to an exemplary embodiment.

FIG. 10 is a block diagram of a UAV access device, according to an exemplary embodiment. The UAV access device may be applied to the MME, and is based on the device illustrated in FIG. 8 or FIG. 9. As illustrated in FIG. 10, the first verification submodule 82 may include a first sending submodule 101, a first succeeding verification submodule 102 and a first failing verification submodule 103.

The first sending submodule 101 is configured to send an update location request to an HSS, the update location request containing the IMSI of the UAV.

The first succeeding verification submodule 102 is configured to, if a first update location reply for indicating that QoS configuration information of the UAV is obtained by query is received from the HSS and the first update location reply contains the QoS configuration information of the UAV, determine that first verification succeeds.

The first failing verification submodule 103 is configured to, if a second update location reply for indicating that the QoS configuration information of the UAV is not obtained by query is received from the HSS, determine that first verification fails.

In the embodiment, the update location request is sent to the HSS, the update location request containing the IMSI of the UAV, it is determined that first verification succeeds if the first update location reply configured to indicate that the QoS configuration information of the UAV is obtained by query is received from the HSS and the first update location reply contains the QoS configuration information of the UAV, and it is determined that first verification fails if the second update location reply configured to indicate that the QoS configuration information of the UAV is not obtained by query is received from the HSS, so that verification over the identity of the user using the UAV is implemented through the MME, and the user identity verification efficiency is further improved.

Figure 11:
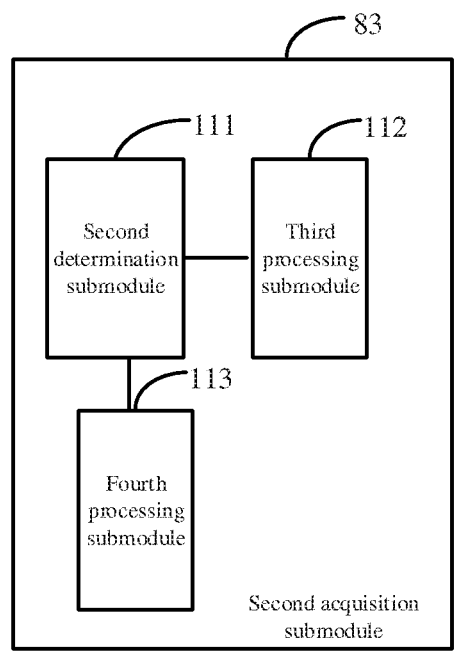
FIG. 11 is a block diagram of a UAV access device, according to an exemplary embodiment.

FIG. 11 is a block diagram of a UAV access device, according to an exemplary embodiment. The UAV access device may be applied to the MME, and is based on the device illustrated in FIG. 8. As illustrated in FIG. 11, the second acquisition submodule 83 may include a second determination submodule 111, a third processing submodule 112 and a fourth processing submodule 113.

The second determination submodule 111 is configured to determine whether the attach request contains the IMEI of the UAV.

The third processing submodule 112 is configured to, if a determination result of the second determination submodule 111 is that the attach request contains the IMEI of the UAV, read the IMEI of the UAV from the attach request.

The fourth processing submodule 113 is configured to, if the determination result of the second determination submodule 111 is that the attach request does not contain the IMEI of the UAV, send a device identity request to the UAV, the device identity request being configured to instruct the UAV to provide the UAV's own IMEI, and receive a device identity response sent by the UAV, the device identity response containing the IMEI of the UAV.

In the embodiment, the IMEI of the UAV may be directly read from the attach request and the UAV may also be actively required to provide its own IMEI. In such a manner, the MME may conveniently verify the device identity through the IMEI provided by the UAV, so that device identity verification efficiency is improved.

Figure 12:
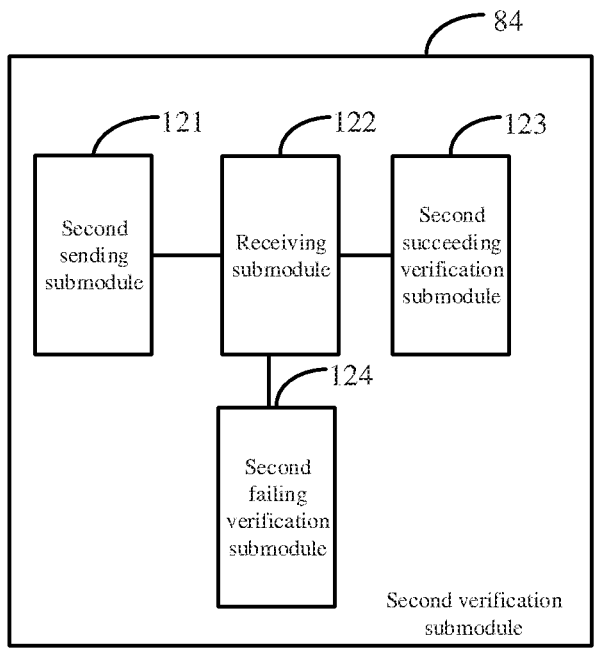
FIG. 12 is a block diagram of a UAV access device, according to an exemplary embodiment.

FIG. 12 is a block diagram of a UAV access device, according to an exemplary embodiment. The UAV access device may be applied to the MME, and is based on the device illustrated in FIG. 8 or FIG. 11. As illustrated in FIG. 12, the second verification submodule 84 may include a second sending submodule 121, a receiving submodule 122, a second succeeding verification submodule 123 and a second failing verification submodule 124.

The second sending submodule 121 is configured to send a device identity check request to an EIR, the device identity check request containing the IMEI of the UAV.

The receiving submodule 122 is configured to receive a device identity check ACK sent by the EIR, the device identity check ACK containing a query result obtained by the MME querying a corresponding registration record according to the IMEI of the UAV.

The second succeeding verification submodule 123 is configured to, if the query result indicates that the registration record of the UAV is obtained by query, determine that second verification succeeds.

The second failing verification submodule 124 is configured to, if the query result indicates that the registration record of the UAV is not obtained by query, determine that second verification fails.

In the embodiment, the device identity check request is sent to the EIR, the device identity check request containing the IMEI of the UAV, the device identity check ACK sent by the EIR is received, the device identity check ACK containing the query result obtained after the MME queries the corresponding registration record according to the IMEI of the UAV, it is determined that second verification succeeds if the query result indicates that the registration record of the UAV is obtained by query, and it is determined that second verification fails if the query result indicates that the registration record of the UAV is not obtained by query, so that verification over the device identity of the UAV is implemented through the EIR, and the device identity verification efficiency is further improved.

Figure 13:
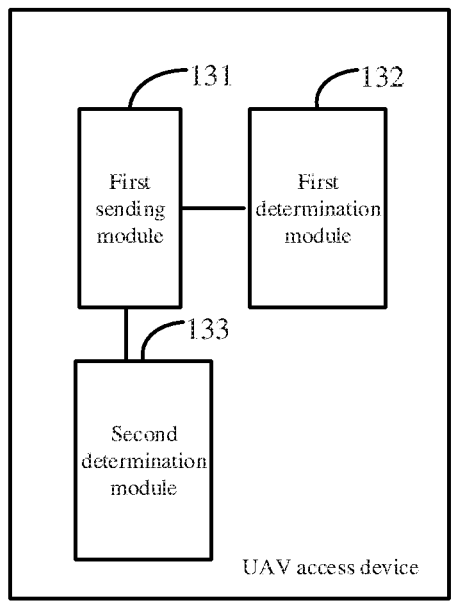
FIG. 13 is a block diagram of a UAV access device, according to an exemplary embodiment.

FIG. 13 is a block diagram of a UAV access device, according to an exemplary embodiment. The UAV access device may be applied to a UAV, the UAV having an IMSI and an IMEI, and is configured to execute the UAV access method illustrated in FIG. 3. As illustrated in FIG. 13, the UAV access device may include a first sending module 131, a first determination module 132 and a second determination module 133.

The first sending module 131 is configured to send an attach request to an MME.

The first determination module 132 is configured to, when a first attach response for indicating that access is allowed is received from the MME, determine that the MME allows access of the UAV.

The second determination module 133 is configured to, when a second attach response for indicating that access is rejected is received from the MME, determine that the MME rejects access of the UAV.

In the embodiment, the attach request is sent to the MME, it is determined that the MME allows access of the UAV when the first attach response for indicating that access is allowed is received from the MME, and it is determined that the MME rejects access of the UAV when the second attach response for indicating that access is rejected is received from the MME, so that the MME may control access of the UAV, and access security of the UAV is improved.

Figure 14:
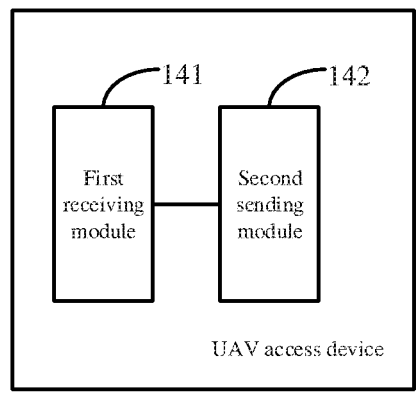
FIG. 14 is a block diagram of a UAV access device, according to an exemplary embodiment.

FIG. 14 is a block diagram of a UAV access device, according to an exemplary embodiment. The UAV access device may be applied to the UAV, and is based on the device illustrated in FIG. 13. As illustrated in FIG. 14, the UAV access device may further include a first receiving module 141 and a second sending module 142.

The first receiving module 141 is configured to receive a user identity request sent by the MME, the user identity request being configured to instruct the UAV to provide the UAV's own IMSI.

The second sending module 142 is configured to send a user identity response to the MME, the user identity response containing the IMSI of the UAV.

In the embodiment, the user identity request sent by the MME is received, the user identity request being configured to instruct the UAV to provide the UAV's own IMSI, and the user identity response is sent to the MME, the user identity response containing the IMSI of the UAV. In such a manner, the MME may conveniently perform user identity verification by use of the IMSI provided by the UAV, so that user identity verification efficiency of the UAV is improved.

Figure 15:
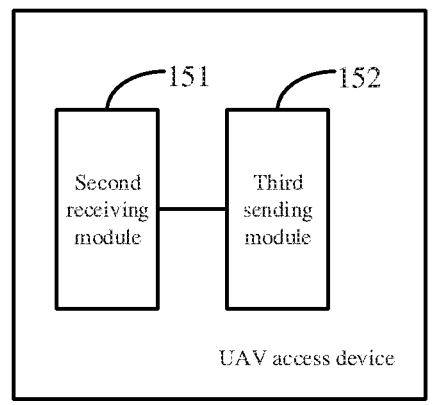
FIG. 15 is a block diagram of a UAV access device, according to an exemplary embodiment.

FIG. 15 is a block diagram of a UAV access device, according to an exemplary embodiment. The UAV access device may be applied to the UAV, and is based on the device illustrated in FIG. 13. As illustrated in FIG. 15, the UAV access device may further include a second receiving module 151 and a third sending module 152.

The second receiving module 151 is configured to receive a device identity request sent by the MME, the device identity request being configured to instruct the UAV to provide the UAV's own IMEI.

The third sending module 152 is configured to send a device identity response to the MME, the device identity response containing the IMEI of the UAV.

In the embodiment, the device identity request sent by the MME is received, the device identity request being configured to instruct the UAV to provide the UAV's own IMEI, and the device identity response is sent to the MME, the device identity response containing the IMEI of the UAV. In such a manner, the MME may conveniently perform device identity verification by use of the IMEI provided by the UAV, so that device identity verification efficiency of the UAV is improved.

In an embodiment, based on the device illustrated in FIG. 13, the attach request contains at least one of the IMSI of the UAV or the IMEI of the UAV.

In the embodiment, the attach request contains at least one of the IMSI of the UAV or the IMEI of the UAV, so that the MME may directly read information, i.e., the IMSI and/or the IMEI, for legality verification of the UAV from the attach request conveniently, and access efficiency of the UAV is further improved.

Figure 16:
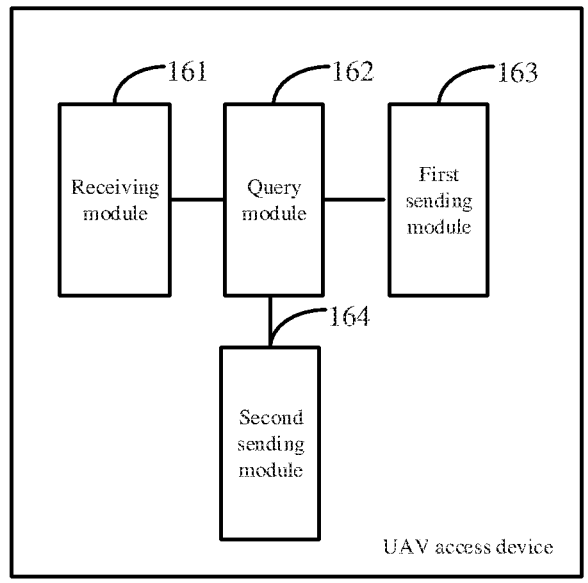
FIG. 16 is a block diagram of a UAV access device, according to an exemplary embodiment.

FIG. 16 is a block diagram of a UAV access device, according to an exemplary embodiment. The UAV access device may be applied to an HSS, the HSS being configured to assist an MME in performing verification over an identity of a user using a UAV, and is configured to execute the UAV access method illustrated in FIG. 4. As illustrated in FIG. 16, the UAV access device may include a receiving module 161, a query module 162, a first sending module 163 and a second sending module 164.

The receiving module 161 is configured to receive an update location request sent by the MME, the update location request containing an IMSI of the UAV that requests for access.

The query module 162 is configured to query dedicated QoS configuration information of the UAV according to the IMSI of the UAV.

The first sending module 163 is configured to, if the QoS configuration information of the UAV is obtained by query, send a first update location reply for indicating that the QoS configuration information of the UAV is obtained by query to the MME, the first update location reply containing the QoS configuration information of the UAV.

The second sending module 164 is configured to, if the QoS configuration information of the UAV is not obtained by query, send a second update location reply for indicating that the QoS configuration information of the UAV is not obtained by query to the MME.

In the embodiment, the update location request sent by the MME is received, the update location request containing the IMSI of the UAV that requests for access, the first update location reply configured to indicate that the QoS configuration information of the UAV is obtained by query is sent to the MME if the QoS configuration information of the UAV is obtained by query, the first update location reply containing the QoS configuration information of the UAV, and the second update location reply configured to indicate that the QoS configuration information of the UAV is not obtained by query is sent to the MME if the QoS configuration information of the UAV is not obtained by query, so that the HSS may assist the MME in completing verification over the identity of the user using the UAV, and access reliability of the UAV is improved.

Figure 17:
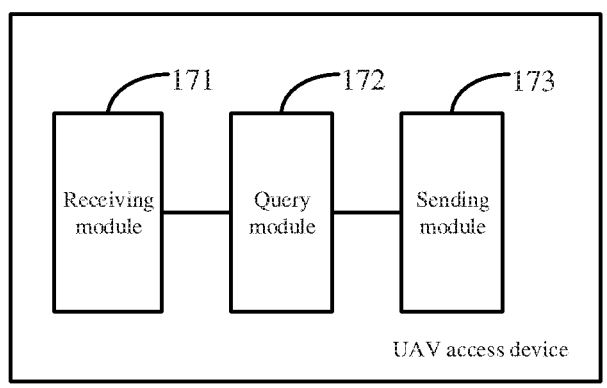
FIG. 17 is a block diagram of a UAV access device, according to an exemplary embodiment.

FIG. 17 is a block diagram of a UAV access device, according to an exemplary embodiment. The UAV access device may be applied to an EIR, the EIR being configured to assist an MME in performing verification over a device identity of a UAV, and is configured to execute the UAV access method illustrated in FIG. 5. As illustrated in FIG. 17, the UAV access device may include a receiving module 171, a query module 172 and a sending module 173.

The receiving module 171 is configured to receive a device identity check request sent by the MME, the device identity check request containing an IMEI of the UAV that requests for access.

The query module 172 is configured to query a corresponding registration record according to the IMEI of the UAV to obtain a query result.

The sending module 173 is configured to send a device identity check ACK containing the query result to the MME.

In the embodiment, the device identity check request sent by the MME is received, the device identity check request containing the IMEI of the UAV that requests for access, the corresponding registration record is queried according to the IMEI of the UAV to obtain the query result, and the device identity check ACK containing the query result is sent to the MME, so that the EIR may assist the MME in completing verification over the device identity of the UAV, and access reliability of the UAV is improved.

The device embodiments substantially correspond to the method embodiments, and thus reference may be made to related parts of the description of the method embodiments. The device embodiments described above are only exemplary, modules and units described as separate parts therein may or may not be physically separated, and parts displayed as modules or units may be located in the same place or may also be distributed to multiple networks. Part or all of the modules therein may be selected according to a practical requirement to achieve the purpose of the solutions of the present disclosure.

The present disclosure also provides a non-transitory computer-readable storage medium having stored thereon a computer program for executing the UAV access method illustrated in FIG. 1 or FIG. 2.

The present disclosure also provides a non-transitory computer-readable storage medium having stored thereon a computer program for executing the UAV access method illustrated in FIG. 3.

The present disclosure also provides a non-transitory computer-readable storage medium having stored thereon a computer program for executing the UAV access method illustrated in FIG. 4.

The present disclosure also provides a non-transitory computer-readable storage medium having stored thereon a computer program for executing the UAV access method illustrated in FIG. 5.

The present disclosure also provides a UAV access device, which is applied to an MME and includes: a processor; and a memory configured to store processor-executable instructions, wherein the processor is configured to: receive an attach request sent by a UAV; verify an identity of a user using the UAV and a device identity of the UAV according to the attach request to obtain a verification result; if the verification result indicates that verification succeeds, allow access of the UAV and send a first attach response for indicating that access is allowed to the UAV; and if the verification result indicates that verification fails, reject access of the UAV and send a second attach response for indicating that access is rejected to the UAV.

Figure 18:
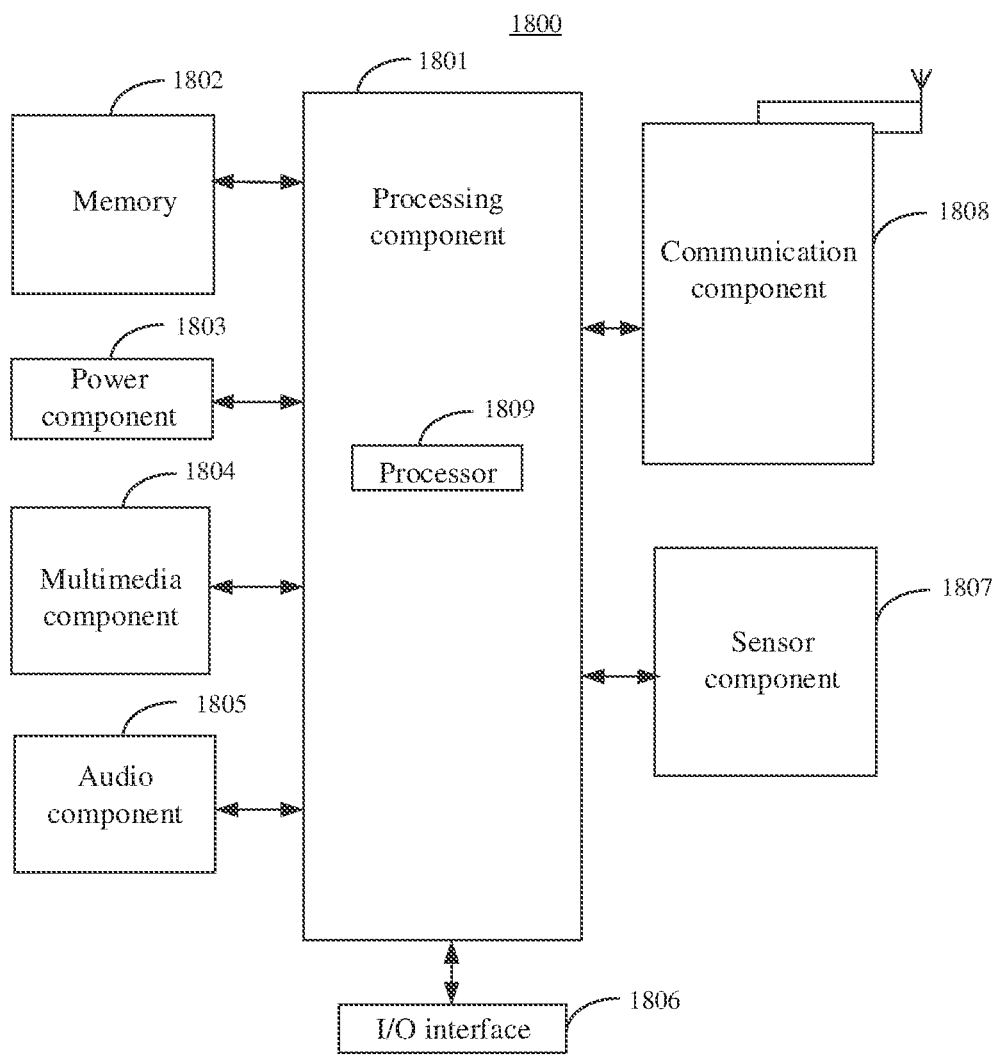
FIG. 18 is a schematic diagram of a UAV access device, according to an exemplary embodiment.

FIG. 18 is a schematic diagram of a UAV access device 1800, according to an exemplary embodiment. For example, the UAV access device 1800 may be provided as an MME.

Referring to FIG. 18, the device 1800 may include one or more of the following components: a processing component 1801, a memory 1802, a power component 1803, a multimedia component 1804, an audio component 1805, an Input/Output (I/O) interface 1806, a sensor component 1807, and a communication component 1808.

The processing component 1801 typically controls overall operations of the device 1800, such as the operations associated with display, telephone calls, data communications, camera operations, and recording operations. The processing component 1801 may include one or more processors 1809 to execute instructions to perform all or part of the steps in the abovementioned method. Moreover, the processing component 1801 may include one or more modules which facilitate interaction between the processing component 1801 and the other components. For instance, the processing component 1801 may include a multimedia module to facilitate interaction between the multimedia component 1804 and the processing component 1801.

The memory 1802 is configured to store various types of data to support the operation of the device 1800. Examples of such data include instructions for any application programs or methods operated on the device 1800, contact data, phonebook data, messages, pictures, video, etc. The memory 1802 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1803 provides power for various components of the device 1800. The power component 1803 may include a power management system, one or more power supplies, and other components associated with generation, management and distribution of power for the device 1800.

The multimedia component 1804 includes a screen providing an output interface between the device 1800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1804 includes a front camera and/or a rear camera. The front camera and/or the rear camera may receive external multimedia data when the device 1800 is in an operation mode, such as a photographing mode or a video mode. Each of the front camera and the rear camera may be a fixed optical lens system or have focusing and optical zooming capabilities.

The audio component 1805 is configured to output and/or input an audio signal. For example, the audio component 1805 includes a Microphone (MIC), and the MIC is configured to receive an external audio signal when the device 1800 is in the operation mode, such as a call mode, a recording mode and a voice recognition mode. The received audio signal may further be stored in the memory 1802 or sent through the communication component 1808. In some embodiments, the audio component 1805 further includes a speaker configured to output the audio signal.

The I/O interface 1806 provides an interface between the processing component 1801 and a peripheral interface module, and the peripheral interface module may be a keyboard, a click wheel, a button and the like. The button may include, but not limited to: a home button, a volume button, a starting button and a locking button.

The sensor component 1807 includes one or more sensors configured to provide status assessment in various aspects for the device 1800. For instance, the sensor component 1807 may detect an on/off status of the device 1800 and relative positioning of components, such as a display and small keyboard of the device 1800, and the sensor component 1807 may further detect a change in a position of the device 1800 or a component of the device 1800, presence or absence of contact between the user and the device 1800, orientation or acceleration/deceleration of the device 1800 and a change in temperature of the device 1800. The sensor component 1807 may include a proximity sensor configured to detect presence of an object nearby without any physical contact. The sensor component 1807 may also include a light sensor, such as a Complementary Metal Oxide Semiconductor (CMOS) or Charge Coupled Device (CCD) image sensor, configured for use in an imaging application. In some embodiments, the sensor component 1807 may also include an acceleration sensor, a gyroscope sensor, a magnetic sensor, a pressure sensor or a temperature sensor.

The communication component 1808 is configured to facilitate wired or wireless communication between the device 1800 and another device. The device 1800 may access a communication-standard-based wireless network, such as a Wireless Fidelity (WiFi) network, a 4th-Generation (4G) or 5th-Generation (5G) network or a combination thereof. In an exemplary embodiment, the communication component 1808 receives a broadcast signal or broadcast associated information from an external broadcast management system through a broadcast channel. In an exemplary embodiment, the communication component 1808 further includes a Near Field Communication (NFC) module to facilitate short-range communication. In an exemplary embodiment, the communication component 1808 may be implemented based on a Radio Frequency Identification (RFID) technology, an infrared Data Association (IrDA) technology, an Ultra-WideBand (UWB) technology, a Bluetooth (BT) technology and another technology.

In an exemplary embodiment, the device 1800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1802 including an instruction, and the instruction may be executed by the processor 1809 of the device 1800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The instruction in the storage medium is executed by the processor to enable the device 1800 to execute any UAV access method.

The present disclosure also provides a UAV access device, which is applied to a UAV, the UAV having an IMSI and an IMEI, the device including: a processor; and a memory configured to store processor-executable instructions, wherein the processor is configured to: send an attach request to an MME; when a first attach response for indicating that access is allowed is received from the MME, determine that the MME allows access of the UAV; and when a second attach response for indicating that access is rejected is received from the MME, determine that the MME rejects access of the UAV.

The present disclosure also provides a UAV access device, which is applied to an HSS, the HSS being configured to assist an MME in performing verification on an identity of a user using a UAV, the device including: a processor; and a memory configured to store processor-executable instructions, wherein the processor is configured to: receive an update location request sent by the MME, the update location request containing an IMSI of the UAV that requests for access; query dedicated QoS configuration information of the UAV according to the IMSI of the UAV; if the QoS configuration information of the UAV is obtained by query, send a first update location reply for indicating that the QoS configuration information of the UAV is obtained by query to the MME, the first update location reply containing the QoS configuration information of the UAV; and if the QoS configuration information of the UAV is not obtained by query, send a second update location reply for indicating that the QoS configuration information of the UAV is not obtained by query to the MME.

Figure 19:
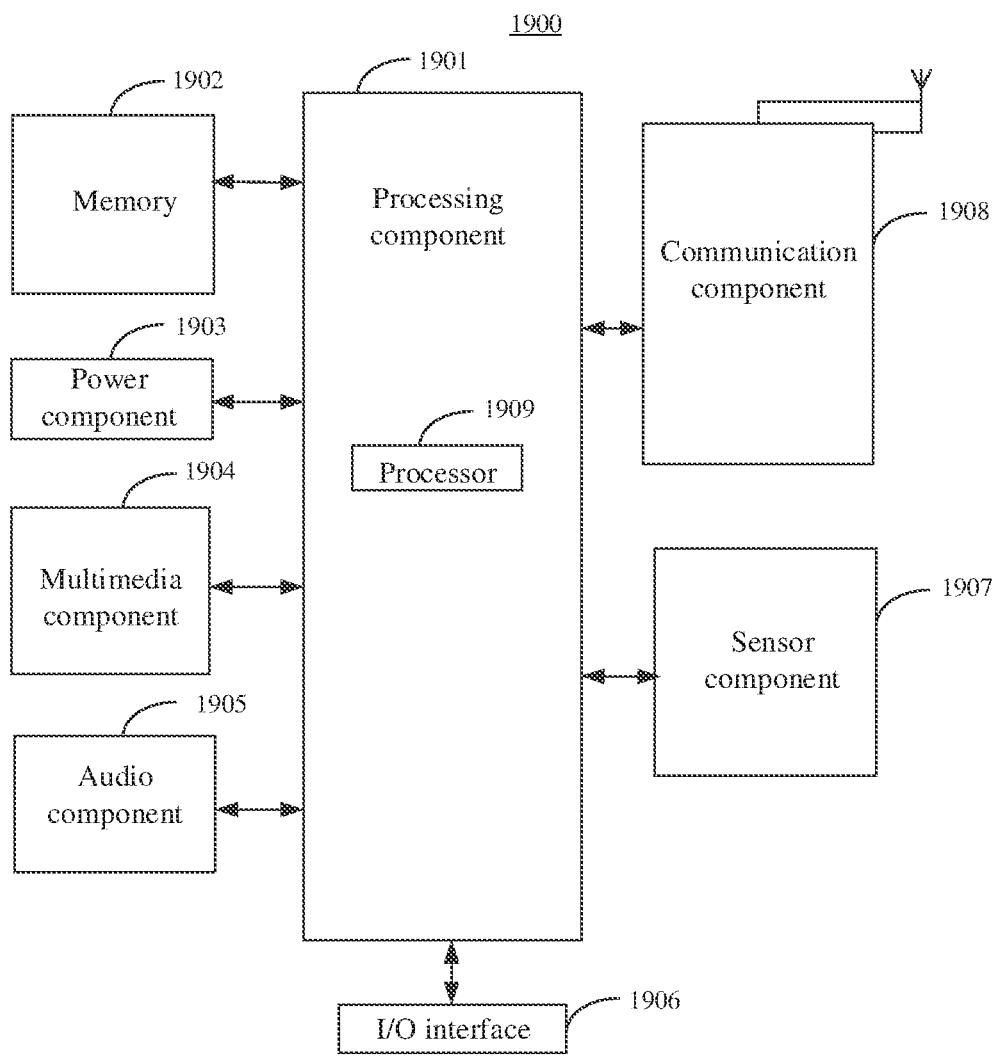
FIG. 19 is a schematic diagram of a UAV access device, according to an exemplary embodiment.

FIG. 19 is a schematic diagram of a UAV access device 1900, according to an exemplary embodiment. For example, the UAV access device 1900 may be provided as a UAV. Referring to FIG. 19, the device 1900 may include one or more of the following components: a processing component 1901, a memory 1902, a power component 1903, a multimedia component 1904, an audio component 1905, an Input/Output (I/O) interface 1906, a sensor component 1907, and a communication component 1908. These components of the device 1900 are similar to those of the device 1800 (FIG. 18) and elaborations thereof will not be repeated herein.

The present disclosure also provides a UAV access device, which is applied to an EIR, the EIR being configured to assist an MME in performing verification over a device identity of a UAV, the device including: a processor; and a memory configured to store processor-executable instructions, wherein the processor is configured to: receive a device identity check request sent by the MME, the device identity check request containing an IMEI of the UAV that requests for access; query a corresponding registration record according to the IMEI of the UAV to obtain a query result; and send a device identity check ACK containing the query result to the MME.

Figure 20:
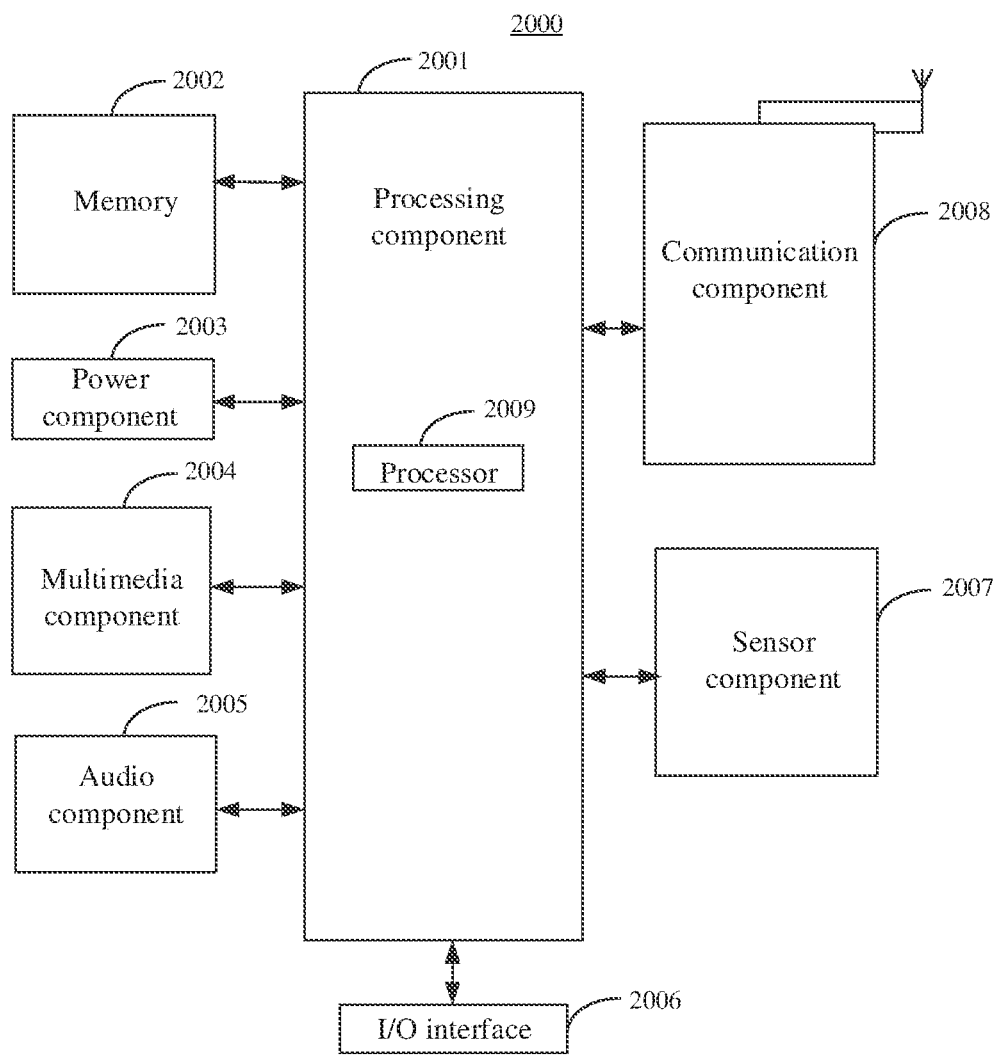
FIG. 20 is a schematic diagram of a UAV access device, according to an exemplary embodiment.

FIG. 20 is a schematic diagram of a UAV access device 2000, according to an exemplary embodiment. For example, the UAV access device 2000 may be provided as an HSS or an EIR. Referring to FIG. 20, the device 2000 may include one or more of the following components: a processing component 2001, a memory 2002, a power component 2003, a multimedia component 2004, an audio component 2005, an Input/Output (I/O) interface 2006, a sensor component 2007, and a communication component 2008. These components of the device 2000 are similar to those of the device 1800 (FIG. 18) and elaborations thereof will not be repeated herein.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for access of an unmanned aerial vehicle (UAV) to a cellular network, comprising:
   receiving an attach request sent by the UAV;
   verifying an identity of a user using the UAV and a device identity of the UAV according to the attach request to obtain a verification result;
   when the verification result indicates that a verification succeeds, allowing the access of the UAV and sending a first attach response for indicating that access is allowed to the UAV; and
   when the verification result indicates that the verification fails, rejecting the access of the UAV and sending a second attach response for indicating that access is rejected to the UAV;
   wherein verifying the identity of the user using the UAV and the device identity of the UAV according to the attach request to obtain the verification result comprises:
   acquiring an International Mobile Subscriber Identification Number (IMSI) of the UAV; and
   performing a first verification on the identity of the user using the UAV according to the IMSI of the UAV, wherein performing the first verification comprises:
     sending, by a Mobility Management Entity (MME), an update location request to a Home Subscriber Server (HSS), the update location request containing the IMSI of the UAV;
     when a first update location reply for indicating that Quality of Service (QoS) configuration information of the UAV is obtained by query is received from the HSS and the first update location reply contains the QoS configuration information of the UAV, determining that the first verification succeeds; and
     when a second update location reply for indicating that the QoS configuration information of the UAV is not obtained by query is received from the HSS, determining that the first verification fails.

2. The method of claim 1, wherein verifying the identity of the user using the UAV and the device identity of the UAV according to the attach request to obtain the verification result further comprises:
   acquiring an International Mobile Equipment Identity (IMEI) of the UAV;
   performing a second verification on the device identity of the UAV according to the IMEI of the UAV;
   when the first verification and the second verification succeed, determining that the verification result indicates that the verification succeeds; and
   when at least one of the first verification and the second verification fails, determining that the verification result indicates that the verification fails.

3. The method of claim 2, wherein acquiring the IMSI of the UAV comprises:
   determining whether the attach request contains the IMSI of the UAV;
   when the attach request contains the IMSI of the UAV, reading the IMSI of the UAV from the attach request; and
   when the attach request does not contain the IMSI of the UAV, sending a user identity request to the UAV, the user identity request being configured to instruct the UAV to provide the IMSI of the UAV, and receiving a user identity response sent by the UAV, the user identity response containing the IMSI of the UAV.

4. The method of claim 2, wherein acquiring the IMEI of the UAV comprises:
   determining whether the attach request contains the IMEI of the UAV;
   when the attach request contains the IMEI of the UAV, reading the IMEI of the UAV from the attach request; and
   when the attach request does not contain the IMEI of the UAV, sending a device identity request to the UAV, the device identity request being configured to instruct the UAV to provide the IMEI of the UAV, and receiving a device identity response sent by the UAV, the device identity response containing the IMEI of the UAV.

5. The method of claim 2, wherein performing the second verification on the device identity of the UAV according to the IMEI of the UAV comprises:
   sending, by a Mobility Management Entity (MME), a device identity check request to an Equipment Identity Register (EIR), the device identity check request containing the IMEI of the UAV;
   receiving a device identity check acknowledgment (ACK) sent by the EIR, the device identity check ACK containing a query result obtained by the MME querying a corresponding registration record according to the IMEI of the UAV;
   when the query result indicates that the registration record of the UAV is obtained by query, determining that the second verification succeeds; and
   when the query result indicates that the registration record of the UAV is not obtained by query, determining that the second verification fails.

6. A method for an unmanned aerial vehicle (UAV) to access a cellular network, the UAV having an International Mobile Subscriber Identification Number (IMSI) and an International Mobile Equipment Identity (IMEI), the method comprising:
   sending an attach request to a Mobility Management Entity (MME);
   receiving a user identity request sent by the MME, the user identity request being configured to instruct the UAV to provide the IMSI of the UAV;
   sending a user identity response to the MME, the user identity response containing the IMSI of the UAV and being configured to instruct the MME to:
     send an update location request to a Home Subscriber Server (HSS), the update location request containing the IMSI of the UAV;
     when a first update location reply for indicating that Quality of Service (QoS) configuration information of the UAV is obtained by query is received from the HSS and the first update location reply contains the QoS configuration information of the UAV, determine that the first verification succeeds; and when a second update location reply for indicating that the QoS configuration information of the UAV is not obtained by query is received from the HSS, determine that the first verification fails;

when a first attach response for indicating that access is allowed is received from the MME, determining that the MME allows access of the UAV; and when a second attach response for indicating that access is rejected is received from the MME, determining that the MME rejects the access of the UAV.

7. The method of claim 6, further comprising:

receiving a device identity request sent by the MME, the device identity request being configured to instruct the UAV to provide the IMEI of the UAV; and sending a device identity response to the MME, the device identity response containing the IMEI of the UAV.

8. The method of claim 6, wherein the attach request contains at least one of the IMSI of the UAV or the IMEI of the UAV.

9. A device for access of an unmanned aerial vehicle (UAV) to a cellular network, comprising:

a processor; and a memory storing instructions executable by the processor, wherein the processor is configured to:

receive an attach request sent by the UAV;

verify an identity of a user using the UAV and a device identity of the UAV according to the attach request to obtain a verification result;

when the verification result indicates that a verification succeeds, allow the access of the UAV and send a first attach response for indicating that access is allowed to the UAV; and when the verification result indicates that the verification fails, reject the access of the UAV and send a second attach response for indicating that access is rejected to the UAV;

wherein the processor is further configured to:

acquire an International Mobile Subscriber Identification Number (IMSI) of the UAV; and perform a first verification on the identity of the user using the UAV according to the IMSI of the UAV, wherein performing the first verification comprises:

sending, by a Mobility Management Entity (MME), an update location request to a Home Subscriber Server (HSS), the update location request containing the IMSI of the UAV;

when a first update location reply for indicating that Quality of Service (QoS) configuration information of the UAV is obtained by query is received from the HSS and the first update location reply contains the QoS configuration information of the UAV, determining that the first verification succeeds; and when a second update location reply for indicating that the QoS configuration information of the UAV is not obtained by query is received from the HSS, determining that the first verification fails.

10. The device of claim 9, wherein the processor is further configured to:

acquire an International Mobile Equipment Identity (IMEI) of the UAV;

perform a second verification on the device identity of the UAV according to the IMEI of the UAV;

when the first verification and the second verification succeed, determine that the verification result indicates that the verification succeeds; and when at least one of first verification and second verification fails, determine that the verification result indicates that the verification fails.

11. The device of claim 10, wherein the processor is further configured to:

determine whether the attach request contains the IMSI of the UAV;

when a determination result is that the attach request contains the IMSI of the UAV, read the IMSI of the UAV from the attach request; and when the determination result is that the attach request does not contain the IMSI of the UAV, send a user identity request to the UAV, the user identity request being configured to instruct the UAV to provide the IMSI of the UAV, and receive a user identity response sent by the UAV, the user identity response containing the IMSI of the UAV.

12. The device of claim 10, wherein the processor is further configured to:

determine whether the attach request contains the IMEI of the UAV;

when a determination result is that the attach request contains the IMEI of the UAV, read the IMEI of the UAV from the attach request; and when the determination result is that the attach request does not contain the IMEI of the UAV, send a device identity request to the UAV, the device identity request being configured to instruct the UAV to provide the IMEI of the UAV, and receive a device identity response sent by the UAV, the device identity response containing the IMEI of the UAV.

13. The device of claim 10, wherein the processor is further configured to:

send, by a Mobility Management Entity (MME), a device identity check request to an Equipment Identity Register (EIR), the device identity check request containing the IMEI of the UAV;

receive a device identity check Acknowledgment (ACK) sent by the EIR, the device identity check ACK containing a query result obtained by the MME querying a corresponding registration record according to the IMEI of the UAV;

when the query result indicates that the registration record of the UAV is obtained by query, determine that the second verification succeeds; and when the query result indicates that the registration record of the UAV is not obtained by query, determine that the second verification fails.

14. A device for access of an unmanned aerial vehicle (UAV) to a cellular network, the UAV having an International Mobile Subscriber Identification Number (IMSI) and an International Mobile Equipment Identity (IMEI), the device comprising:

a processor; and a memory storing instructions executable by the processor, wherein the processor is configured to:

send an attach request to a Mobility Management Entity (MME);

receive a user identity request sent by the MME, the user identity request being configured to instruct the UAV to provide the IMSI of the UAV;

send a user identity response to the MME, the user identity response containing the IMSI of the UAV and being configured to instruct the MME to:
    send an update location request to a Home Subscriber Server (HSS), the update location request containing the IMSI of the UAV;
    when a first update location reply for indicating that Quality of Service (QoS) configuration information of the UAV is obtained by query is received from the HSS and the first update location reply contains the QoS configuration information of the UAV, determine that the first verification succeeds; and
    when a second update location reply for indicating that the QoS configuration information of the UAV is not obtained by query is received from the HSS, determine that the first verification fails;
when a first attach response for indicating that access is allowed is received from the MME, determine that the MME allows the access of the UAV; and
when a second attach response for indicating that access is rejected is received from the MME, determine that the MME rejects the access of the UAV.

15. The device of claim 14, wherein the processor is further configured to:
receive a device identity request sent by the MME, the device identity request being configured to instruct the UAV to provide the IMEI of the UAV; and
send a device identity response to the MME, the device identity response containing the IMEI of the UAV.

16. The device of claim 14, wherein the attach request contains at least one of the IMSI of the UAV or the IMEI of the UAV.

* * * * *